Oct. 10, 1944.　　　　F. V. WALTZ　　　　2,360,181
UNIVERSAL INDICATOR
Original Filed July 31, 1941
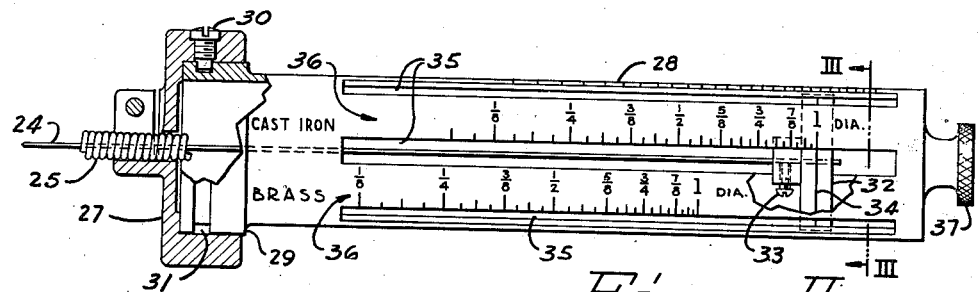
Fig. II
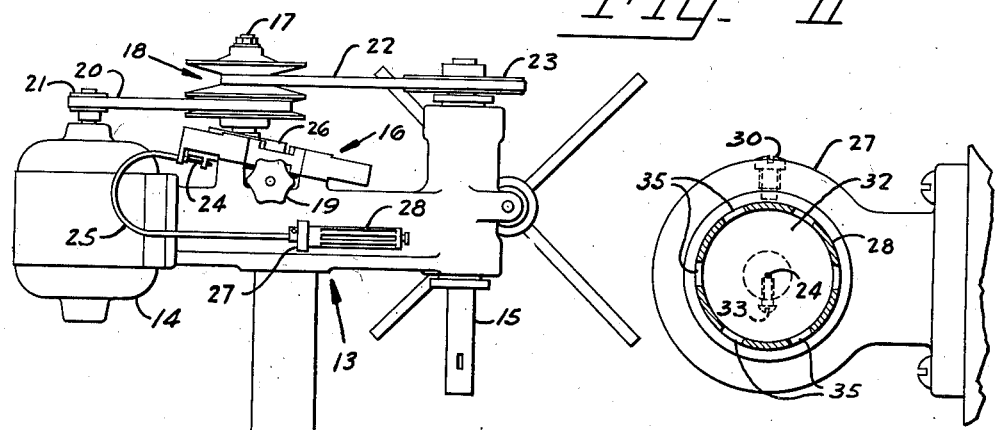
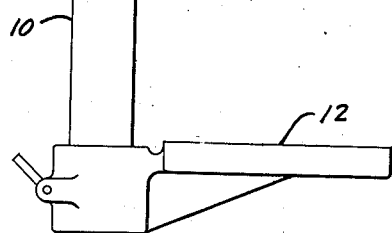
Fig. III
Fig. I
INVENTOR.
Foster V. Waltz
BY
Marshall & Marshall
ATTORNEYS Patented Oct. 10, 1944

2,360,181

UNITED STATES PATENT OFFICE 2,360,181

UNIVERSAL INDICATOR

Foster V. Waltz, Toledo, Ohio

Original application July 31, 1941, Serial No. 404,867. Divided and this application July 20, 1942, Serial No. 451,559

6 Claims. (Cl. 116—135)

This invention relates to universal indicators particularly designed for use with variable speed transmission devices for indicating the changes in speed caused by such devices in any one or more of a plurality of different terms or ratios.

This application is a continuation in part of my copending application Serial No. 404,867, filed July 31, 1941, which issued as Patent Number 2,293,230 on August 18, 1942, and which discloses a variable speed transmission device.

Many machine tools, such as drill presses, lathes, grinders, shapers, milling machines, etc., are designed for use in cutting or forming a variety of different kinds of metals. Different metals, being of different hardnesses, require different cutting or drilling speeds and these speeds are again differentiated between the sizes of drills and other tools with which the metal is worked. It is necessary for the machine tool operator to set the speed of operation of the machine tool both for the size of the tool being driven and the type of metal or material which is being operated upon. This setting requires either frequent reference to guide charts or a setting from memory, which may or may not be accurate and correct for the material and the size of the tool.

It may also be desirable to afford an indication of the speed of a tool or other driven object in different terms which should be easily selectable for reference, i. e., the speed may be shown in revolutions per minute, linear feet per minute, cycles, inches of feed per minute or any one of a plurality of other terms or ratios.

It is an object of this invention to provide an indicator for use with speed changing transmission devices which has a plurality of scales or groups of indicia so that the speed of a machine tool can be controlled by reference directly to the indicating means where the speed can be translated into a plurality of different terms and ratios.

It is another object of this invention to provide a universal indicator which can be mounted in any position relative to the transmission device with which it is adapted to be used.

More specific objects and advantages are apparent from the description, in which reference is had to the accompanying drawing illustrating a preferred form of indicator embodying the invention.

In the drawing:

Fig. I is a side elevational view of a drill press equipped with an indicator embodying the invention.

Fig. II is a greatly enlarged view, in elevation, of an indicator embodying the invention, certain parts being broken away to more clearly show details of construction.

Fig. III is a vertical sectional view, taken substantially on the line III—III of Fig. II.

This specific drawing and the specific description that follows merely disclose and illustrate the invention and are not intended to impose limitations upon the claims.

A drill press, comprising an upright column 10, base 11, worktable 12 and head 13, is equipped with a driving motor 14 and a belt driven hand-feed tool-holding spindle 15. A variable speed transmission device 16 is bolted to the top of the frame 13 and has an upright jackshaft 17 on which is journaled a dual sheave composite pulley 18. A variable speed transmission suitable for such use is disclosed in my above-mentioned copending application Serial No. 404,867. The transmission 16 is controlled by a handwheel 19 which translates the composite pulley 18 along the line between the motor 14 and spindle 15. A belt 20 is engaged in a motor pulley 21 which is secured on the shaft of the motor 14 and one sheave of the composite pulley 18. A second belt 22 is engaged in the other sheave of the composite pulley 18 and in a spindle pulley 23 which is secured on the upper end of the tool-holding spindle 15. By rotating the handwheel 19, the jackshaft 17 and the composite pulley thereon are moved away from or toward the motor shaft or spindle which causes the diameters of the sheaves of the composite pulley 18 to change, thereby changing the resulting driven speed of the spindle 15.

An inner wire 24 (see also Fig. II) of a Bowden cable 25 is clamped to a movable block 26 in the transmission 16 in which the jackshaft 17 is secured. The sheath of the Bowden cable is clamped to the stationary frame of the transmission 16. The opposite end of the sheath of the Bowden cable 25 is clamped in a socketed bracket 27 which (in the embodiment shown) is secured to the side of the frame 13 of the drill press. The bracket 27 is provided with means for mounting and may, therefore, be attached to a bench, a wall, a standard, or in any other position where it is most easily seen by the machine tool operator. A tube 28, which has a shoulder 29 at one of its ends, is mounted in the bracket 27 by means of a set screw 30 threaded transversely through one of the walls of the bracket 27 and into an annular groove 31 which is cut in the outer surface of the shoulder 29. The end of the wire which projects from that end of the Bowden cable attached to the bracket 27 extends into the interior of the tube 28 and is clamped to a disk-like indicator 32 by a set screw 33. The diameter of the indicator 32 is just slightly smaller than the interior diameter of the tube 28. The indicator 32 has a circumferential indicating line 34 inscribed around its periphery.

The tube 28 has a plurality of longitudinal apertures 35 cut through its wall, through which apertures the indicating line 34 on the periphery of the disk-like indicator 32 is visible. Several series of indicia 36 are marked on the exterior of the tube 28, one of them being inscribed on one edge of each of the apertures 35. Each one of these sets of indicia 36 is in different terms or ratios depending upon the information which it is desired shall be afforded.

In the embodiment of the invention shown in Fig. II the two sets of indicia illustrated correspond to drill sizes for drilling in cast iron and in brass. Others of the apertures 35 which are not visible in Fig. II would carry the same drill sizes so located as to correspond to correct drilling speeds for high and low carbon content steel, aluminum, copper, nickel, etc.

A knurled knob 37 is fastened on the right end of the tube 28 so that the tube can be rotated in the bracket 27 to turn that one of the sets of indicia 36 corresponding to the metal to be worked into reading position. With the correct scale in position, for example, the cast iron scale, if the hole to be drilled has a diameter of one inch, the handwheel 19, which controls the transmission device 16, is turned until the indicator is in the position shown in Fig. II, in which case the transmission device 16 is so adjusted as to give the tool-holding spindle 15 the correct speed for drilling cast iron with a one inch drill. Similarly, if the material to be drilled were brass, the tube 28 would be rotated upwardly from the position shown in Fig. II until that aperture 35 corresponding to brass was in position for reading. Since brass is a softer metal than cast iron, the drill speeds should be higher than for the harder metal and, therefore, the drill size indicia is marked on the brass scale further to the left than on the cast iron scale. Consequently, in order to set the transmission device 16 properly, the handwheel 19 would be rotated, moving the shaft 17 to the right in Fig. I and the indicator 32 to the left in Figs. I and II until it registered with the proper drill size in the brass scale.

If it is desired that the indication be given in terms or ratios other than those scribed on the tube 28, such tube easily may be replaced with another tube bearing such terms or ratios.

The embodiment of the invention that has been disclosed may be modified to meet various requirements.

Having described the invention, I claim:

1. An indicator for a variable speed transmission having a member movable in proportion to changes in speed comprising, in combination, a tubular member, means for mounting said tubular member, said tubular member having a plurality of longitudinal viewing apertures, a scale associated with each of said apertures and an index cooperable with each of said scales and movable in response to movement of said movable member to indicate changes in speed in terms of each of said scales.

2. An indicator for a variable speed transmission having a member movable in proportion to changes in speed comprising, in combination, a bracket, a tubular member rotatably mounted in said bracket, said tubular member having a plurality of longitudinal viewing apertures and a different scale associated with each of said apertures, and a single index member directly connected to said movable member and slidable within said tubular member.

3. An indicator for use with a variable condition changing mechanism having a member movable in proportion to changes in such condition, comprising, in combination, a bracket, a tubular member rotatably mounted in said bracket, said tubular member having a plurality of longitudinal viewing apertures in the wall thereof, a scale associated with each of said apertures, each of said scales comprising indicia of different terms and ratios, and a single index member longitudinally slidable within said tubular member and directly connected to said movable member of said condition changing mechanism.

4. An indicator for a variable speed transmission employed with a material working machine, said transmission having a member movable in proportion to changes in speed comprising, in combination, a tubular member, means for mounting said tubular member, said tubular member having a plurality of longitudinal viewing apertures, a scale associated with each of said apertures and an index cooperable with each of said scales and movable in response to movement of said movable member to indicate changes in speed in terms of each of said scales, each of said scales representing a different type of material to be worked, each of said scales comprising a series of tool size indicia.

5. An indicating device for use with variable speed transmission mechanisms, said indicating device comprising, in combination, a plurality of scales each bearing indicia marked to designate a series of diameters of holes to be drilled, the indicia on each scale being spaced in accordance with the machining characteristics of a material to be drilled, and the scale being labeled to designate material having machining characteristics according to such spacing, an index, means for so connecting said index to variable speed transmission mechanism that said index is automatically positioned in accordance with the speed for which the variable speed transmission mechanism is set, and means for selectively bringing said scales into visible cooperative relation with said index.

6. An indicating device for use with variable speed transmission mechanisms, said indicating device comprising, in combination, a plurality of scales each bearing indicia marked to designate a series of diameters of holes to be drilled, the indicia on each scale being spaced in accordance with the machining characteristics of a material to be drilled, and the scale being labeled to designate material having machining characteristics according to such spacing, an index, means for so connecting said index to variable speed transmission mechanism that said index is automatically positioned in accordance with the speed for which the variable speed transmission mechanism is set, and means for selectively bringing said scales into visible cooperative relation with said index and simultaneously bringing the labeling of the selected scales into convenient visibility.

FOSTER V. WALTZ.